United States Patent
Im et al.

(10) Patent No.: US 12,319,265 B2
(45) Date of Patent: Jun. 3, 2025

(54) HYBRID SYSTEM FOR VEHICLE PROVIDED WITH PLURALITY OF ENGINE POWER GENERATION MODULES

(71) Applicants: HYUNDAI MOTOR COMPANY, Seoul (KR); KIA CORPORATION, Seoul (KR)

(72) Inventors: Hyuk Im, Suwon-si (KR); Jin-Nam Kim, Gunpo-si (KR); Kyeong-Hyeon Lee, Seongnam-si (KR); Seung-Mok Choi, Seoul (KR); Hong-Kil Baek, Seoul (KR); Seung-Suk Yoon, Anyang-si (KR); Yeong-Seop Park, Hanam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/668,908

(22) Filed: May 20, 2024

(65) Prior Publication Data

US 2025/0010842 A1    Jan. 9, 2025

(30) Foreign Application Priority Data

Jul. 5, 2023    (KR) .................. 10-2023-0087151

(51) Int. Cl.
*B60W 30/188*    (2012.01)
*B60W 10/26*    (2006.01)
*B60W 20/13*    (2016.01)

(52) U.S. Cl.
CPC ............ *B60W 10/26* (2013.01); *B60W 20/13* (2016.01); *B60W 2510/244* (2013.01)

(58) Field of Classification Search
CPC ................. B60W 10/26; B60W 20/13; B60W 2510/244; B60K 5/08
See application file for complete search history.

(56) References Cited

U.S. PATENT DOCUMENTS

| 8,884,451 B2 | 11/2014 | Hatanaka |
| 10,023,195 B2 | 7/2018 | Miller et al. |
| 11,225,242 B1 | 1/2022 | Bolthouse et al. |
| 2003/0015356 A1 * | 1/2003 | Wolfgang .............. B62D 55/00 180/6.5 |

(Continued)

FOREIGN PATENT DOCUMENTS

| DE | 19839231 A1 * | 3/2000 | ............... B60K 5/08 |
| DE | 10005527 A1 * | 8/2001 | ............. B60K 17/12 |

(Continued)

*Primary Examiner* — Tisha D Lewis
(74) *Attorney, Agent, or Firm* — MCDONNELL BOEHNEN HULBERT & BERGHOFF LLP (57) ABSTRACT

A hybrid system for a vehicle having an engine and a driving motor includes a plurality of engine power generation modules for generating power with an operation of the engine, a battery for storing power output from the engine power generation modules, a plurality of driving modules for driving the driving motor for driving wheels of the vehicle by the power output from the engine power generation modules or the battery, and a control unit for selectively controlling operations of the engine power generation modules and the driving modules to match a required output of the vehicle.

19 Claims, 7 Drawing Sheets

(56) References Cited

U.S. PATENT DOCUMENTS

| | | | |
|---|---|---|---|
| 2003/0051477 A1* | 3/2003 | Franklin | F02D 41/266 |
| | | | 60/711 |
| 2007/0012505 A1* | 1/2007 | Walter | B62D 11/14 |
| | | | 180/444 |
| 2009/0223726 A1* | 9/2009 | Jeon, II | B60L 3/0053 |
| | | | 180/65.285 |
| 2015/0027124 A1* | 1/2015 | Hartig | B63H 21/14 |
| | | | 60/702 |
| 2016/0046193 A1 | 2/2016 | Park | |
| 2020/0127586 A1 | 4/2020 | Chretien | |

FOREIGN PATENT DOCUMENTS

| | | | | |
|---|---|---|---|---|
| DE | 102007057597 A1 * | 7/2009 | | B60K 5/08 |
| EP | 2657058 A2 * | 10/2013 | | B60K 5/08 |
| KR | 2013-0045337 A | 5/2013 | | |

* cited by examiner

HYBRID SYSTEM FOR VEHICLE PROVIDED WITH PLURALITY OF ENGINE POWER GENERATION MODULES

CROSS REFERENCE TO RELATED APPLICATIONS

This application claims priority to Korean Patent Application No. 10-2023-0087151, filed on Jul. 5, 2023, which is incorporated herein by reference in its entirety.

BACKGROUND

Field of the Disclosure

The present disclosure relates to a hybrid system for a vehicle using an engine and a driving motor as a driving source, and more specifically, to a hybrid system for a vehicle provided with a plurality of engine power generation modules having an engine, in which each of the plurality of engine power generation modules is selectively operated with its optimal efficiency in response to a required output.

Description of Related Art

Among driving methods of vehicles, a hybrid system drives a vehicle by operating either an engine for combusting fuel or a driving motor operated by power applied from a battery or by operating both the engine and the driving motor.

Depending on a traveling speed, a slope angle, an acceleration of the vehicle, or the like, any one or both of the engine and the driving motor are operated.

Meanwhile, in large-sized commercial vehicles, a hybrid system is configured by coupling an engine with large displacement, a driving motor, a transmission, and the like. The engine and the driving motor are operated by a preset logic according to the traveling conditions of the vehicle. Accordingly, the engine has no choice but to be operated according to the preset logic even in a section thereof with a low efficiency of the engine. In general, immediately after the engine is started, or when the vehicle is driven at a high speed, the efficiency of the engines shows a tendency to rapidly decrease.

However, there has been a problem in that the engine should be inevitably operated in a section with a low efficiency as well as with a high fuel consumption according to the preset logic, which raises unreasonable results to be solved.

SUMMARY

The present disclosure seeks to solve the above-referenced problems and is directed to a hybrid system for a vehicle provided with a plurality of engine power generation modules, in which a plurality of engine power generation modules including an engine with small displacement is employed, and each of the plurality of the engines of the engine power generation modules are configured to be driven selectively, wherein each of the plurality of engines is operated in a section with an optimal efficiency to match a required output of the vehicle.

To achieve the object, a hybrid system for a vehicle having an engine and a driving motor may include a plurality of engine power generation modules configured to generate power with an operation of the engine, a battery configured to store power output from the plurality of the engine power generation modules, a plurality of driving modules configured to drive the driving motor for driving wheels of the vehicle by power input from the plurality of the engine power generation module or the battery, and a control unit configured to control operations of the plurality of the engine power generation modules and the plurality of the driving modules according to a required output of the vehicle.

The engine power generation system may include the engine, a generator driven by the engine to generate power, and a converter configured to convert the power output from the generator and output the power to the battery or the plurality of driving modules.

The control unit may derive an overall engine efficiency map from an individual engine efficiency map of each engine provided in each engine power generation module, and drive the plurality of engine power generation modules according to the overall engine efficiency map according to the required output of the vehicle.

The control unit may derive an overall engine efficiency map by connecting the individual engine efficiency maps so that optimal efficiency sections in which a fuel consumption rate is smaller than or equal to a predetermined reference are connected to each other.

The control unit may determine an operation order of the plurality of engine power generation modules, and derive an overall engine efficiency map where a portion at which the fuel consumption rate is inflected to increase in the individual engine efficiency map of the engine of the first-operated engine power generation module is connected to an optimal efficiency section of the individual engine efficiency map of the engine of the next-operated engine power generation module.

The control unit may maintain the output of the engine of the first-operated engine power generation module when the required output of the vehicle increases at the portion at which the fuel consumption rate is inflected to increase in the individual engine efficiency map of the engine of the first-operated engine power generation module, and then operate a next engine power generation module.

The control unit may operate all of the engine power generation modules by increasing the outputs thereof when receiving an increase in the required output of the vehicle at the portion at which the fuel consumption rate is inflected to increase in the individual engine efficiency map of the engine of the last-operated engine power generation module.

The control unit may be configured to change an operation order of the plurality of engine power generation modules.

Engines provided in the plurality of engine power generation modules may be configured to have different displacements, and the control unit may be configured to selectively operate the plurality of engine power generation modules according to the required output of the vehicle.

Engines provided in the plurality of engine power generation modules may be configured to have the same displacement, and the control unit may be configured to selectively operate the plurality of engine power generation modules according to the required output of the vehicle.

Engines provided in the plurality of engine power generation modules may be configured such that engines of some engine power modules have the same displacements, and engines of the remaining engine power generation modules have different displacements, and the control unit is configured to selectively operate the engine power generation modules according to the required output of the vehicle.

The driving module may include an inverter configured to convert a direct current into an alternating current, a driving motor configured to generate a driving force, and a reducer connected to an output shaft of the driving motor to reduce a rotational speed of the output shaft.

A hybrid system for a vehicle having an engine and a driving motor may include a plurality of engine power generation modules configured to generate power with an operation of the engine, a battery configured to store power output from the plurality of engine power generation modules, a plurality of driving modules configured to operate the driving motor for driving wheels of the vehicle by power input from the plurality of engine power generation modules or the battery, and a control unit configured to control operations of the plurality of engine power generation modules and the plurality of driving modules, wherein the control unit is configured to selectively operate each engine of the plurality of engine power generation modules with an optimum efficiency to match a required output of the vehicle.

The control unit of the hybrid system for the vehicle may be configured to derive an overall engine efficiency map from an individual engine efficiency map of each engine provided in each engine power generation module, and drive the plurality of engine power generation modules according to the overall engine efficiency map according to the required output of the vehicle.

The control unit the hybrid system for the vehicle may be configured to derive an overall engine efficiency map by connecting the individual engine efficiency maps so that optimal efficiency sections in which a fuel consumption rate is smaller than or equal to a predetermined reference are connected to each other.

The engines provided in the plurality of engine power generation modules of the hybrid system for the vehicle are configured to have different displacements, and the control unit is configured to selectively operate the plurality of engine power generation modules according to the required output of the vehicle.

The engines provided in the plurality of engine power generation modules of the hybrid system for the vehicle are configured to have the same displacement, and the control unit is configured to selectively operate the plurality of engine power generation modules according to the required output of the vehicle.

The engines provided in the plurality of engine power generation modules of the hybrid system for the vehicle are configured to use the same fuel.

The engines provided in the plurality of engine power generation modules of the hybrid system for the vehicle are configured to use different fuels.

A hybrid system for a vehicle having an engine and a driving motor may include a plurality of engine power generation modules configured to generate power with an operation of the engine, a battery configured to store power output from the plurality of engine power generation modules, a plurality of driving modules configured to drive the driving motor for driving wheels of the vehicle by power input from the plurality of engine power generation modules or the battery, and a control unit configured to control operations of the plurality of engine power generation modules and the plurality of driving modules, wherein engines provided in the plurality of engine power generation modules are configured such that engines of some engine power modules have the same displacements, and engines of the remaining engine power generation modules have different displacements, and wherein the control unit is configured to selectively operate each engine of the plurality of engine power generation modules with an optimum efficiency to match a required output of the vehicle.

According to the hybrid system for a vehicle provided with the plurality of engine power generation modules according to the present disclosure having the above configuration, by constituting an engine power generation module using the engine with the small displacement and providing the engine power generation modules in plural, it is possible to selectively operate a plurality of the engine power generation modules according to the required output of the vehicle.

In addition, in a case that two or more engine power generation modules are operated, as each engine power generation module is operated under operation conditions in which each engine shows an optimal efficiency in each engine power generation module, each engine may be operated in a section having a high efficiency.

In addition, since the engine in the plurality of the engine power generation modules is operated alternately, it is possible to increase durability thereof.

In addition, by providing a different displacement to each engine of the plurality of engine power generation modules, it is possible to actively respond to various required outputs of the vehicle.

DETAILED DESCRIPTION

Hereinafter, a hybrid system for a vehicle provided with a plurality of engine power generation modules according to the present disclosure will be described in detail with reference to the accompanying drawings.

Figure 1:
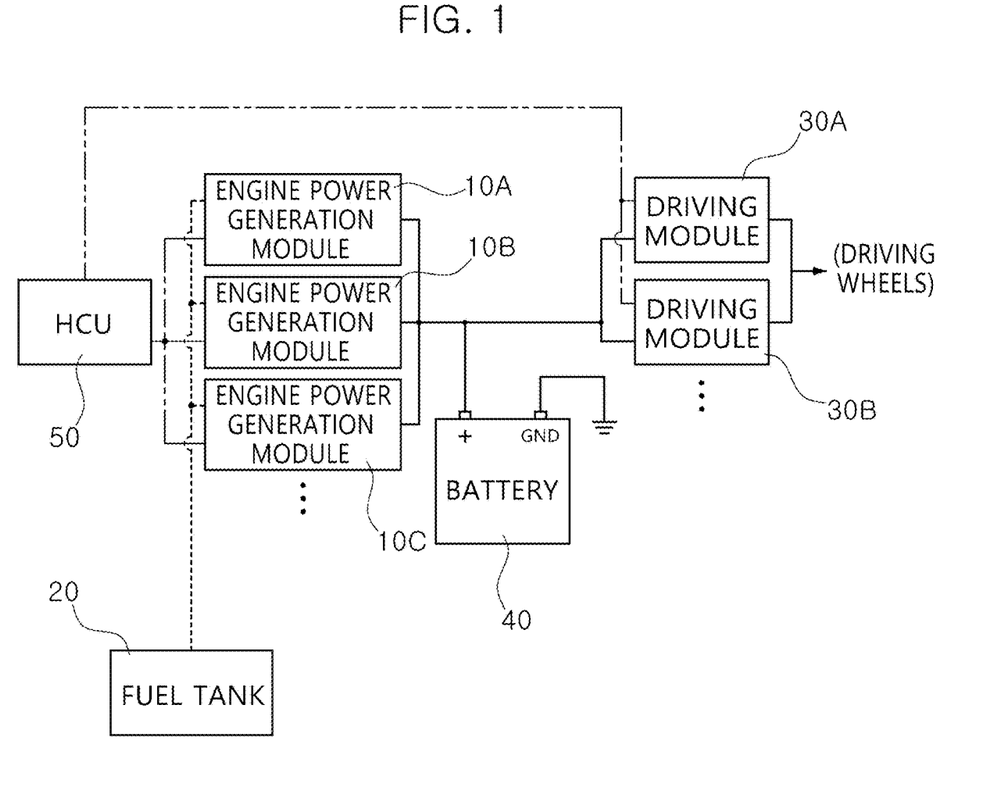
FIG. 1 is a block diagram showing a hybrid system for a vehicle provided with a plurality of engine power generation modules according to the present disclosure.

The hybrid system for a vehicle provided with a plurality of engine power generation modules according to the present disclosure may include a plurality of engine power generation modules 10A, 10B, and 10C for generating power with an operation of an engine 11, a battery 40 for storing power output from the engine power generation modules 10A, 10B, and 10C, a plurality of driving modules 30A and 30B for driving wheels (not shown) of the vehicle by the power output from the engine power generation modules 10A, 10B, and 10C or the battery 40, and a control unit 50 for controlling operations of the engine power generation modules 10A, 10B, and 10C and the driving modules 30A and 30B according to a required output of the vehicle.

The engine power generation modules 10A, 10B, and 10C generate power by operating the engine 11. A plurality of the engine power generation modules 10A, 10B, and 10C may be provided so that a driving force required to drive the vehicle may be generated. In the present disclosure, referring to FIG. 1, it is shown an example in which the three engine power generation modules 10A, 10B, and 10C are provided as a first engine power generation module 10A, a second engine power generation module 10B, and a third engine power generation module 10C. However, it is noted that a fewer or larger number of engine power generation modules may be provided according to a maximum required output of the vehicle. In addition, even when the maximum required output of the vehicle is the same, the number of engine power generation modules may be changed.

In the present disclosure, the vehicle may be a commercial vehicle such as a truck. The commercial vehicle may be heavy and may travel in a state in which a heavy load is loaded thereon. Therefore, conventionally, diesel engines with large displacement have been used as a driving source for the commercial vehicles.

However, in the present disclosure, the plurality of engine power generation modules 10A, 10B, and 10C including an engine 11 with a small displacement may be provided and is selectively operated according to the required output of the vehicle to drive the wheels of the vehicle.

Figure 2:
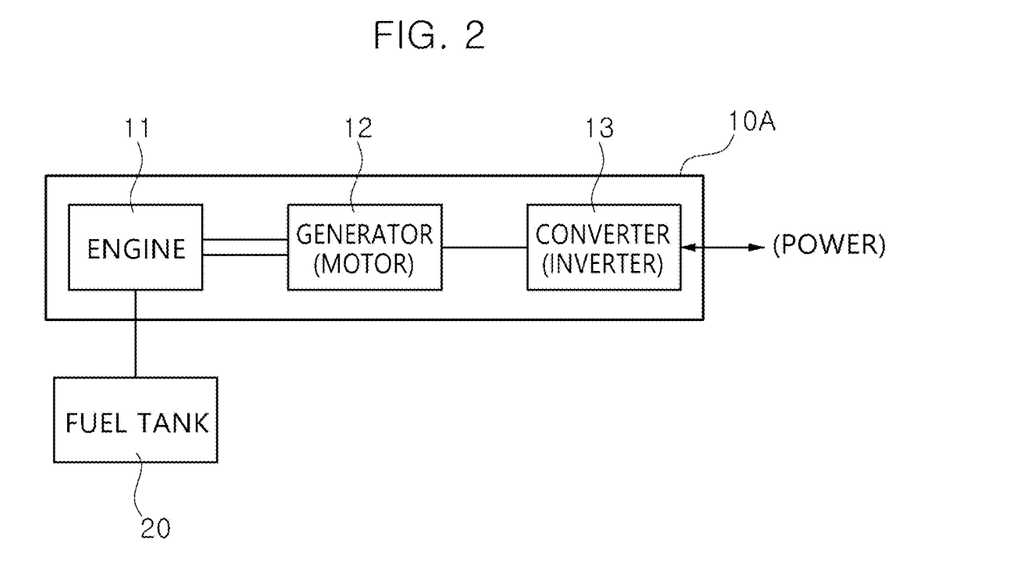
FIG. 2 is a block diagram showing the engine power generation module in the hybrid system for a vehicle provided with the plurality of engine power generation modules according to the present disclosure.

The engine power generation modules 10A, 10B, and 10C each may include an engine 11, a generator 12 driven by the engine 11 to generate power, and a converter 13 for converting the power output from the generator 12 and outputting the power to the battery 40 or the driving modules 30A and 30B. Here, when the engine 11 is started, the generator 12 and the converter 13 may be operated by a starting motor (not shown) and an inverter 31, respectively. Although FIG. 2 shows one engine power generation module 10A, similarly, each of the remaining engine power generation modules 10B and 10C may also include the engine 11, the generator 12, and the converter 13.

The engine 11 may be an internal combustion engine for generating a driving force by combusting fuel. An example of the engine 11 may include a gasoline engine, a diesel engine, a liquefied petroleum gas (LPG) engine, a compressed natural gas (CNG) engine, or the like. In addition, the engine 11 may be a hydrogen engine or an ammonia engine which does not emit carbon dioxide during operation.

Meanwhile, since the engine power generation modules 10A, 10B, and 10C may adopt various types of internal combustion engines as described above, engines using different fuels may be applied to the engine power generation modules 10A, 10B, and 10C, respectively. However, it is preferable that the engine 11 using the same fuel be applied to the engine power generation modules 10A, 10B, and 10C. When the engines using same fuels may be applied to the engine power generation modules 10A, 10B, and 10C, a fuel supply system supplied to each engine 11 may be unified.

Even when the engine power generation modules 10A, 10B, and 10C use the same fuel, the displacements of the engines 11 applied to the engine power generation modules 10A, 10B, and 10C may be different, and the plurality of engine power generation modules 10A, 10B, and 10C may be selectively operated according to the required output of the vehicle. For example, even when the engine power generation modules 10A, 10B, and 10C may be referred to as a first engine power generation module 10A, a second engine power generation module 10B, and a third engine power generation module 10C and a gasoline engine may be applied to each of the engine power generation modules 10A, 10B, and 10C, the first engine power generation module 10A and the second engine power generation module 10B may adopt a 2.5 L turbo engine, and the third engine power generation module 10C may adopt a 1.6 L turbo engine.

Of course, the engines 11 provided in the plurality of engine power generation modules 10A, 10B, and 10C may be configured to have the same displacement, and the control unit 50 may selectively operate the plurality of engines power generation modules 10A, 10B, and 10C according to the required output of the vehicle.

In addition, in the plurality of engine power generation modules 10A, 10B, and 10C, some of the engine power generation modules 10B and 10C may have the same engine displacement, and the remaining engine power generation module 10A may have a different engine displacement, and thus the engine power generation modules 10A, 10B, and 10C may be operated selectively by the control unit 50.

An example of a combination of the plurality of the engine power generation modules is described as follows.

Two engine power generation modules may be applied, and the first engine power generation module 10A and the second engine power generation module 10B may be configured and operated with the same engine displacement. For example, by constituting the first engine power generation module 10A and the second engine power generation module 10B to have a displacement of 2 L with the same output, the control unit 50 may selectively operate the first engine power generation module 10A and the second engine power generation module 10B according to the required output of the vehicle.

Alternatively, two engine power generation modules can be applied, and the first engine power generation module 10A may be configured to have a displacement of 3 L, and the second engine power generation module 10B may be configured to have a displacement of 1 L. The control unit 50 may mainly operate the first engine power generation module 10A and operate the second engine power generation module 10B additionally in a section in which the maximum output of the vehicle is required, or in a low output section like a constant speed section on a flat road, may mainly operate the second engine power generation module 10B and operate the first engine power generation module 10A when the required output is added.

Meanwhile, the three engine power generation modules may be applied, and the first engine power generation module 10A may adopt the engine with a displacement of 2 L, and the engines of the second engine power generation module 10B and the third engine power generation module 10C may be configured to have a displacement of 1 L, and according to the required output of the vehicle, the control unit 50 may control only any one of the first engine power generation module 10A to the third engine power generation module 10C to be operated or two or all engine power generation modules to be operated.

The number of plurality of engine power generation modules 10A, 10B, and 10C and the displacement of the engine applied to each of the engine power generation modules 10A, 10B, and 10C may be applied in various ways and according to the required output of the vehicle, the control unit 50 may determine and operate the number or order of operations of the engine power generation modules 10A, 10B, and 10C.

Since the engine power generation modules 10A, 10B, and 10C all include the engine 11 and the generator 12, when the engine power generation modules 10A, 10B, and 10C are operated, the engine 11 may operate the generator 12 to output power, and the amount of power generation may be determined according to a rotational speed and an output torque of the engine 11.

A fuel tank 20 for storing the fuel supplied to the engine 11 may be installed at one side of the vehicle. The fuel tank 20 may supply fuel to all of the first engine power generation module 10A to the third engine power generation module 10C.

The battery 40 may store the power output from the engine power generation modules 10A, 10B, and 10C. The battery 40 may output the stored power to the driving modules 30A and 30B, which will be described below, if necessary.

The driving modules 30A and 30B may drive the wheels of the vehicle to travel the vehicle. The driving modules 30A and 30B may directly receive the power output from the engine power generation modules 10A, 10B, and 10C or receive the power stored in the battery 40.

Figure 3:
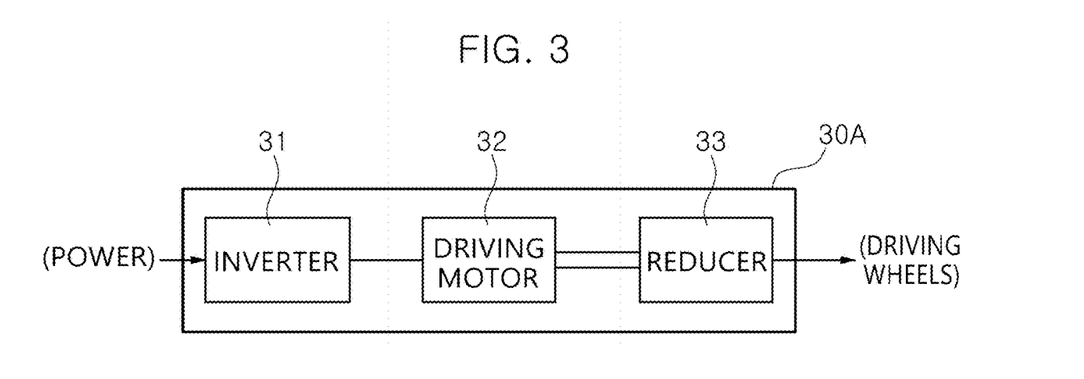
FIG. 3 is a block diagram showing a driving module in the hybrid system for a vehicle provided with the plurality of engine power generation modules according to the present disclosure.

The driving modules 30A and 30B each may include an inverter 31 for converting a direct current into an alternating current, a driving motor 32 for generating a driving force, and a reducer 33 connected to an output shaft of the driving motor 32 to reduce a rotational speed of the output shaft. Although FIG. 3 shows one driving module 30A, the remaining driving module 30B may also include the inverter 31, the driving motor 32, and the reducer 33.

The driving modules 30A and 30B may also be installed in the number required for the vehicle. For example, when rear wheels of the vehicle have two axles, the two driving modules 30A and 30B may be provided as a first drive module 30A and a second drive module 30B and installed to drive the axle of each rear wheel. Alternatively, when the rear wheels of the vehicle have three axles, three driving modules may be installed to drive the axle of each rear wheel.

Meanwhile, it would be appreciated that the outputs of the driving modules 30A and 30B may be output through a single output shaft.

The control unit 50 may control operations of the engine power generation modules 10A, 10B, and 10C and the driving modules 30A and 30B according to the required output to drive the vehicle.

When controlling the operations of the engine power generation modules 10A, 10B, and 10C, the control unit 50 may derive the overall engine efficiency map M from individual engine efficiency maps M_1, M_2, and M_3 of the engines 11 provided in the engine power generation modules 10A, 10B, and 10C and drive the plurality of engine power generation modules 10A, 10B, and 10C according to the overall engine efficiency map M according to the required output.

Figure 4:
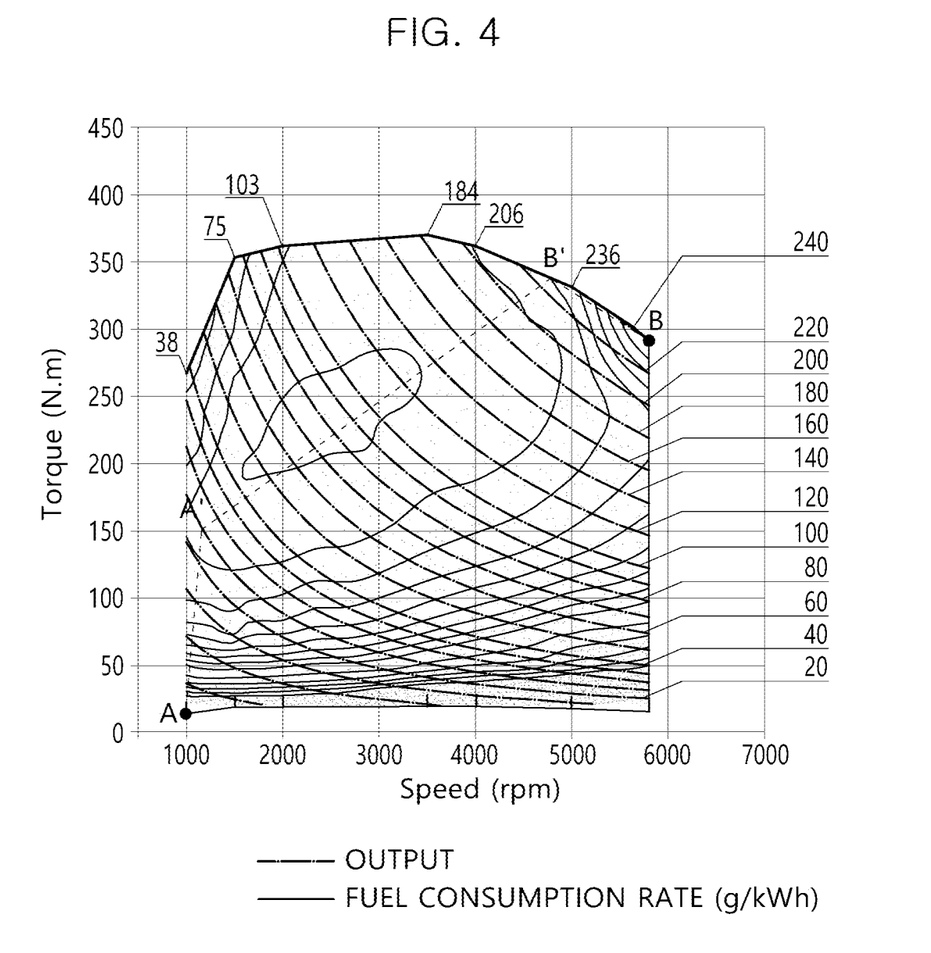
FIG. 4 is a graph showing an output and fuel consumption rate according to a rotational speed and a torque of an engine.
Figure 5:
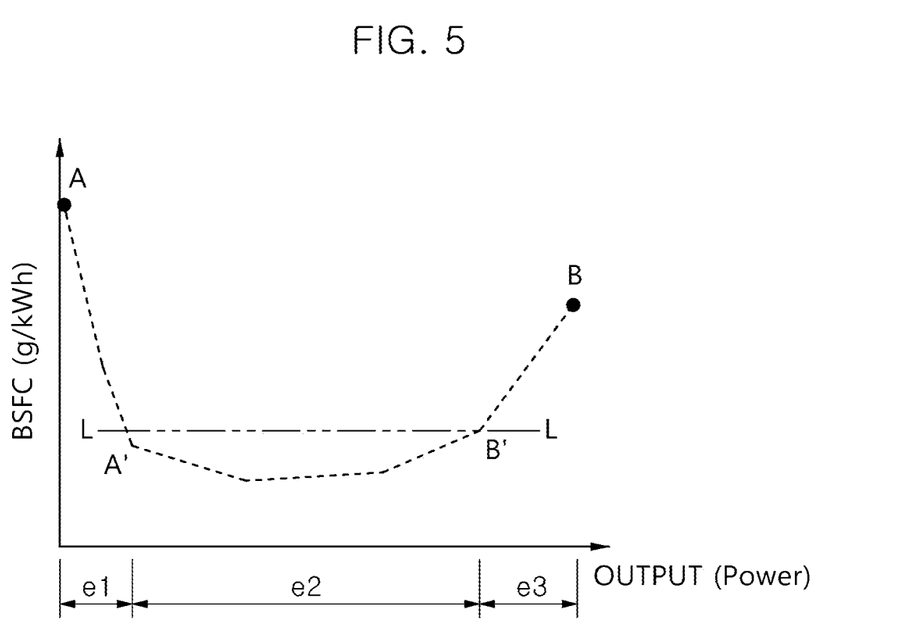
FIG. 5 is a graph showing a relationship between the output and fuel consumption rate of an individual engine in the engine power generation modules.
Figure 6:
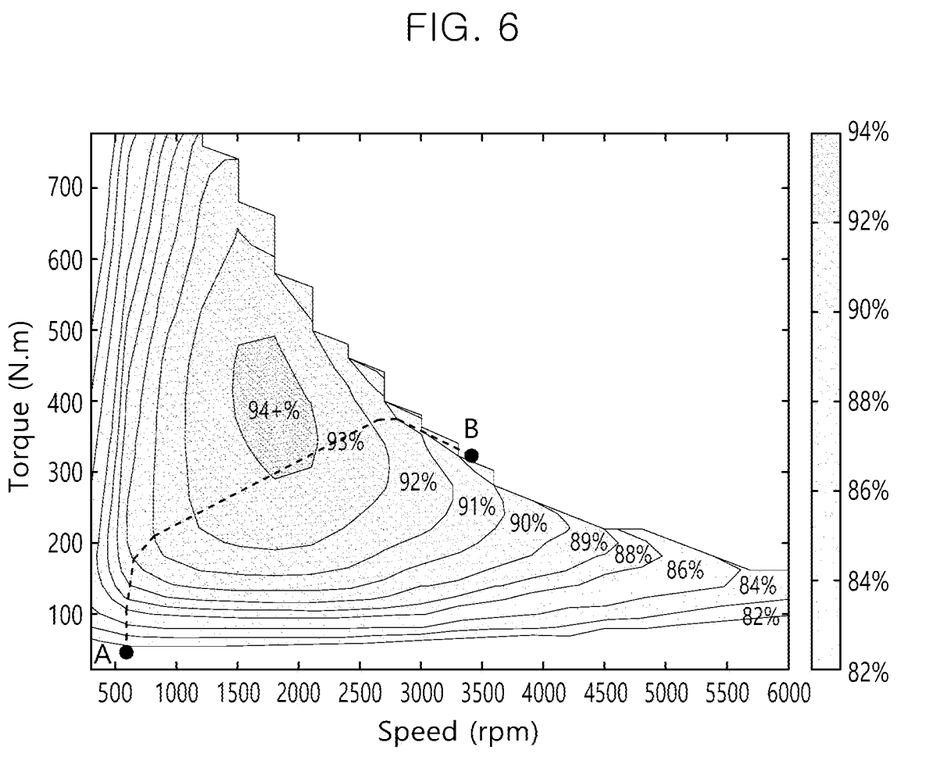
FIG. 6 is a graph showing an example of a power generation efficiency according to the rotational speed and output of the engine in the engine power generation module in the hybrid system for a vehicle provided with the plurality of engine power generation modules according to the present disclosure.

Typically, the engine 11 may have characteristics as shown in FIGS. 4 and 5 during operation. The engine 11 may have combustion characteristics which follow A-A'-B'-B from a low output due to a low revolution per minute (RPM) of the engine 11 to a maximum output, and the RPM is inflected at A' and B'. In FIG. 5, sections e1 and e3 may be sections in which the fuel consumption rate may be higher than the output and the fuel consumption rate rapidly decreases (section e1) or increases (section e3), resulting in poor operating efficiency of the engine 11. Section e2 is a section in which the fuel consumption rate is lower than the output and the fuel consumption rate changes smoothly and is a section in which since a torque proportional to the RPM of the engine 11 is generated and a constant output is output, the engine 11 may operate at an optimal efficiency. As shown in FIG. 6, section e2 may also be a section with excellent power generation efficiency.

Depending on the types of the engines 11 applied to the engine power generation modules 10A, 10B, and 10C, the specific forms of the engine efficiency maps and the specific values of the engine efficiency maps may be different, but the overall trend is shown in FIGS. 4 and 5.

Figure 7:
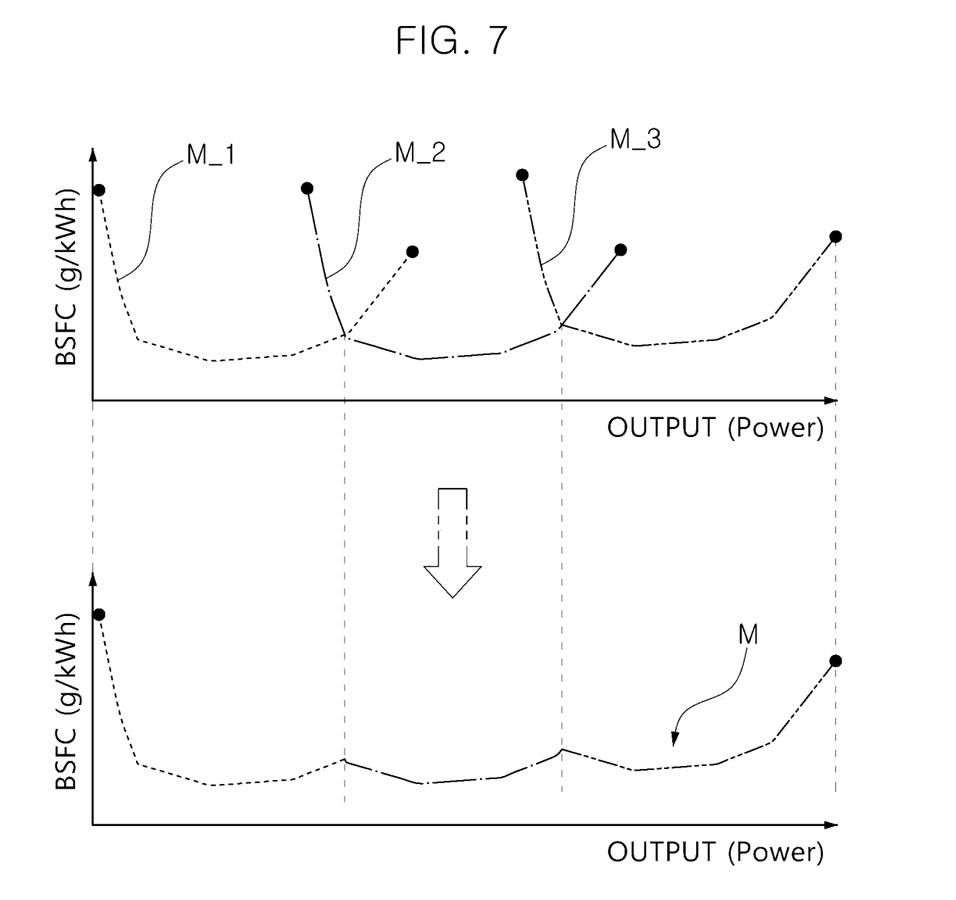
FIG. 7 is a graph showing a relationship between the output and fuel consumption rate of the hybrid system derived from an output and fuel consumption rate of an individual engine power generation module in the hybrid system for a vehicle provided with the plurality of engine power generation modules according to the present disclosure.

Therefore, as shown in FIG. 7, the control unit 50 may derive an overall engine efficiency map M from an individual engine efficiency maps M_1, M_2, and M_3 of the engines 11 provided in the engine power generation modules 10A, 10B, and 10C. The overall engine efficiency map M may be derived by connecting the individual engine efficiency maps M_1, M_2, and M_3 so that an optimal efficiency sections in which the fuel consumption rate is smaller than or equal to a predetermined reference value L (See FIG. 5) in the individual engine efficiency maps M_1, M_2, and M_3 of the first engine power generation module 10A to the third engine power generation module 10C are connected. In other words, the overall engine efficiency map M may be derived in a form of connecting section e2 of each individual engine in each of the engine power generation modules 10A, 10B, and 10C.

As described above, when the overall engine efficiency map M is derived, the control unit 50 may drive the plurality of engine power generation modules 10A, 10B, and 10C according to the overall engine efficiency map M according to the required output so that power may be generated from each of the engine power generation modules 10A, 10B, and 10C.

In particular, the control unit 50 may determine an operation order of the plurality of engine power generation modules 10A, 10B, and 10C and derive the overall engine efficiency map M according to the order. The reason why the control unit 50 determines the operation order of the engine power generation modules 10A, 10B, and 10C may be to increase durability by alternately determining the operation order of the engine power generation modules 10A, 10B, and 10C to decrease a deviation of cumulative operation times of the engine power generation modules 10A, 10B, and 10C because the durability of a first-operated engine power generation module 10A among the engine power generation modules 10A, 10B, and 10C is first degraded accordingly in a case that the operation order of the engine power generation modules 10A, 10B, and 10C is fixed.

The process of determining the operation order of the engine power generation modules 10A, 10B, and 10C and deriving the overall engine efficiency map M according to the order by the control unit 50 may allow a portion B' at which the fuel consumption rate is inflected to increase in the individual engine efficiency maps M_1, M_2, and M_3 of the engines 11 of the first-operated engine power generation modules 10A, 10B, and 10C to be connected to optimal efficiency sections of the individual engine efficiency maps M_1, M_2, and M_3 of the engines 11 of a next-operated engine power generation modules 10A, 10B, and 10C.

Figure 8:
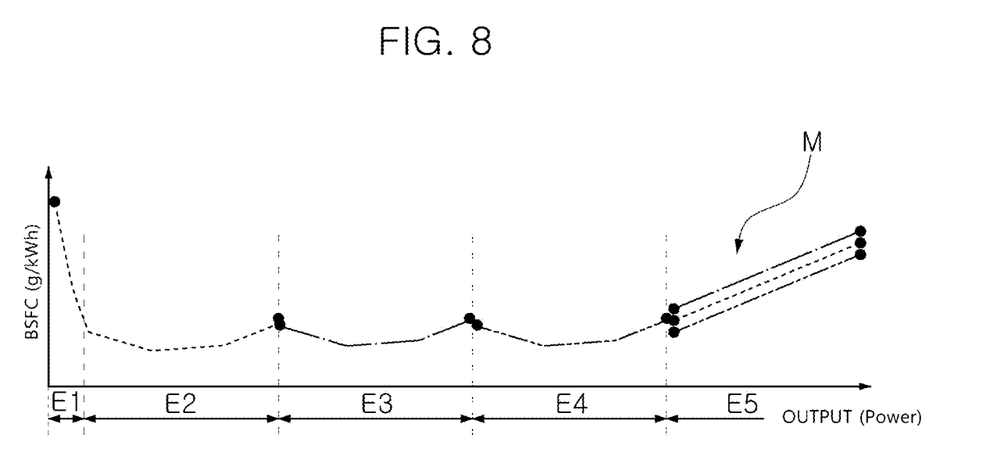
FIG. 8 is a graph showing a relationship of the fuel consumption rate according to the output in the hybrid system for a vehicle provided with the plurality of engine power generation modules according to the present disclosure.
Figure 9:
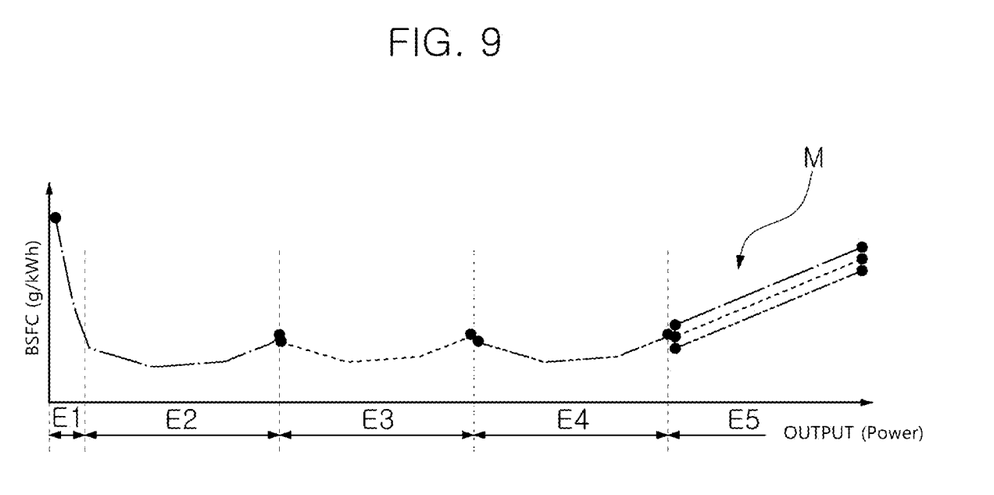
FIG. 9 is a graph showing a relationship of the fuel consumption rate according to the output according to a replacement of the engine power generation module in the hybrid system for a vehicle provided with the plurality of engine power generation modules according to the present disclosure.

FIGS. 8 and 9 show an example in which the control unit 50 may determine the operation order of the engine power generation modules 10A, 10B, and 10C to derive the overall engine efficiency map M. In FIGS. 8 and 9, the individual engine efficiency maps of the first engine power generation module 10A to the third engine power generation module 10C may be shown in a dotted line, a dash line, or a double dash line, respectively, and according to the output of the vehicle, the first engine power generation module 10A to the third engine power generation module 10C may be sequentially operated additionally.

FIG. 8 shows an example in which the control unit 50 determines the operation order of the first engine power generation module 10A, the second engine power generation module 10B, and the third engine power generation module 10C. At an initial start section (section E1) and a low output section (section E2) of the vehicle, only the first engine power generation module 10A may be operated. Thereafter, when the required output of the vehicle increases and enters a medium output section (section E3), the second engine power generation module 10B may be operated additionally. In the medium output section of the vehicle, the output of the first engine power generation module 10A may not be increased, and the first engine power generation module 10A may be operated in an end state of section E2, and from the time when entering section E3, the second engine power generation module 10B may be operated additionally along the optimal efficiency section of the second engine power generation module 10B. In other words, in section E3, the first engine power generation module 10A may be operated in an end state of the section E2, and the second engine power generation module 10B may be operated along section E3. When section E2 is changed to section E3, the first engine power generation module 10A may not be operated in a high output section with a low efficiency (e.g., section e3 in FIG. 5), and the second engine power generation module 10B may not be operated in a low-efficiency start section (e.g., section e1 in FIG. 5), and thus low-efficiency sections in the first engine power generation module 10A and the second engine power generation module 10B may be avoided. Thereafter, when entering a high output section (section E4) due to an increase in the required output of the vehicle, the first engine power generation module 10A may be operated in an end state of section E2, and the second engine power generation module 10B may be operated in an end state of the section E3, and additionally, the third engine power generation module 10C may be operated along section E4. Meanwhile, since the maximum output section (section E5) is a section in which output is required, the output may be increased in each of the first engine power generation module 10A to the third engine power generation module 10C to respond to the required output of the vehicle.

Therefore, the vehicle may be driven with an optimal efficiency in section E2 to section E4.

FIG. 9 shows an example in which the control unit 50 determines the operation order of the first engine power generation module 10A, the second engine power generation module 10B, and the third engine power generation module 10C.

In FIG. 9, the second engine power generation module 10B may be operated earlier than the first engine power generation module 10A. The second engine power generation module 10B may be first operated in section E1 and section E2, and when the required output of the vehicle increases, the second engine power generation module 10B may be operated in the end state of section E2, and the first engine power generation module 10A may be additionally operated along section E3. Thereafter, when the required output of the vehicle increases, the second engine power generation module 10B may be operated in the end state of section E2, and the first engine power generation module 10A may be operated in the end state of section E3, and additionally, the third engine power generation module 10C may be operated along section E4. In addition, when entering section E5, which is the maximum output section, the first engine power generation module 10A to the third engine power generation module 10C may increase the output, respectively and thus may be driven according to the required output of the vehicle.

The control unit 50 may be a hybrid control unit (HCU).

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A hybrid system for a vehicle having an engine and a driving motor, the hybrid system comprising:
   a plurality of engine power generation modules configured to generate power with an operation of the engine;
   a battery configured to store power output from the plurality of engine power generation modules;
   a plurality of driving modules configured to drive the driving motor for driving wheels of the vehicle by power input from the plurality of engine power generation modules or the battery; and
   a control unit configured to control operations of the plurality of engine power generation modules and the plurality of driving modules according to a required output of the vehicle;
   wherein the control unit is further configured to:
   derive an overall engine efficiency map from an individual engine efficiency map of each engine provided in each engine power generation module;
   determine an operation order of the plurality of engine power generation modules; and
   derive the overall engine efficiency map where a portion at which the fuel consumption rate is inflected to increase in the individual engine efficiency map of the engine of a first-operated engine power generation module is connected to an optimal efficiency section of the individual engine efficiency map of the engine of a next-operated engine power generation module.

2. The hybrid system of claim 1, wherein each engine power generation module includes:
   the engine;
   a generator driven by the engine to generate power; and a converter configured to convert the power output from the generator and output the power to the battery or the plurality of driving modules.

3. The hybrid system of claim 1, wherein the control unit is further configured to:
drive the plurality of engine power generation modules according to the overall engine efficiency map according to the required output of the vehicle.

4. The hybrid system of claim 3, wherein the control unit derives the overall engine efficiency map by connecting the individual engine efficiency maps so that optimal efficiency sections in which a fuel consumption rate is smaller than or equal to a predetermined reference are connected to each other.

5. The hybrid system of claim 1, wherein the control unit is further configured to maintain an output of the engine of the first-operated engine power generation module when the required output of the vehicle increases at the portion at which the fuel consumption rate is inflected to increase in the individual engine efficiency map of the first-operated engine power generation module, and then to operate a next engine power generation module.

6. The hybrid system of claim 5, wherein the control unit is further configured to operate all of the engine power generation modules by increasing the outputs thereof when receiving an increase in the required output of the vehicle at the portion at which the fuel consumption rate is inflected to increase in the individual engine efficiency map of the engine of a last-operated engine power generation module.

7. The hybrid system of claim 1, wherein the control unit is further configured to change an operation order of the plurality of engine power generation modules.

8. The hybrid system of claim 1, wherein engines provided in the plurality of engine power generation modules are configured to have different displacements, and
wherein the control unit is configured to operate the plurality of engine power generation modules according to the required output of the vehicle.

9. The hybrid system of claim 1, wherein engines provided in the plurality of engine power generation modules are configured to have a same displacement, and
wherein the control unit is configured to operate the plurality of engine power generation modules according to the required output of the vehicle.

10. The hybrid system of claim 1, wherein engines provided in the plurality of engine power generation modules are configured such that engines of some engine power modules have same displacements, and engines of remaining engine power generation modules have different displacements, and
wherein the control unit is configured to operate the plurality of engine power generation modules according to the required output of the vehicle.

11. The hybrid system of claim 1, wherein the driving module includes:
an inverter configured to convert a direct current into an alternating current;
a driving motor configured to generate a driving force; and
a reducer connected to an output shaft of the driving motor and configured to reduce a rotation speed of the output shaft.

12. A hybrid system for a vehicle having an engine and a driving motor, the system, comprising:
a plurality of engine power generation modules configured to generate power with an operation of the engine;
a battery configured to store power output from the plurality of engine power generation modules;
a plurality of driving modules configured to drive the driving motor for driving wheels of the vehicle by power input from the plurality of engine power generation modules or the battery; and
a control unit configured to control operations of the plurality of engine power generation modules and the plurality of driving modules;
wherein the control unit is configured to operate each engine of the plurality of engine power generation modules with an optimum efficiency to match a required output of the vehicle;
wherein the control unit is further configured to:
derive an overall engine efficiency map from an individual engine efficiency map of each engine provided in each engine power generation module;
determine an operation order of the plurality of engine power generation modules; and
derive the overall engine efficiency map where a portion at which the fuel consumption rate is inflected to increase in the individual engine efficiency map of the engine of a first-operated engine power generation module is connected to an optimal efficiency section of the individual engine efficiency map of the engine of a next-operated engine power generation module.

13. The system of claim 12, wherein the control unit is further configured to:
drive the plurality of engine power generation modules according to the overall engine efficiency map according to the required output of the vehicle.

14. The system of claim 13, wherein the control unit derives the overall engine efficiency map by connecting the individual engine efficiency maps so that optimal efficiency sections in which a fuel consumption rate is smaller than or equal to a predetermined reference are connected to each other.

15. The system of claim 12, wherein engines provided in the plurality of engine power generation modules are configured to have different displacements, and
wherein the control unit is configured to operate the plurality of engine power generation modules according to the required output of the vehicle.

16. The hybrid system of claim 12, wherein engines provided in the plurality of engine power generation modules are configured to have a same displacement, and p1 wherein the control unit is configured to operate the plurality of engine power generation modules according to the required output of the vehicle.

17. The hybrid system of claim 12, wherein engines provided in the plurality of engine power generation modules are configured to use a same fuel.

18. The hybrid system of claim 12, wherein engines provided in the plurality of engine power generation modules are configured to use different fuels.

19. A hybrid system for a vehicle having an engine and a driving motor, the system, comprising:
a plurality of engine power generation modules configured to generate power with an operation of the engine;
a battery configured to store power output from the plurality of engine power generation modules;
a plurality of driving modules configured to drive the driving motor for driving wheels of the vehicle by power input from the plurality of engine power generation modules or the battery; and a control unit configured to control operations of the plurality of engine power generation modules and the plurality of driving modules;

wherein engines provided in the plurality of engine power generation modules are configured such that engines of some engine power modules have same displacements, and engines of remaining engine power generation modules have different displacements; and wherein the control unit is configured to operate each engine of the plurality of engine power generation modules with an optimum efficiency to match a required output of the vehicle;

wherein the control unit is further configured to:
derive an overall engine efficiency map from an individual engine efficiency map of each engine provided in each engine power generation module;

determine an operation order of the plurality of engine power generation modules; and derive the overall engine efficiency map where a portion at which the fuel consumption rate is inflected to increase in the individual engine efficiency map of the engine of a first-operated engine power generation module is connected to an optimal efficiency section of the individual engine efficiency map of the engine of a next-operated engine power generation module.

* * * * *